(12) United States Patent
Tatham

(10) Patent No.: US 6,960,737 B2
(45) Date of Patent: Nov. 1, 2005

(54) GAS FLOW PRE-CHARGE FOR A PLASMA ARC TORCH

(75) Inventor: David A. Tatham, Enfield, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 10/652,755

(22) Filed: Aug. 29, 2003

(65) Prior Publication Data
US 2005/0045600 A1 Mar. 3, 2005

(51) Int. Cl.[7] .............................................. B23K 10/00
(52) U.S. Cl. .............................. 219/121.5; 219/121.55; 219/121.54; 219/121.59
(58) Field of Search ....................... 219/121.54, 121.57, 219/121.56, 121.55, 121.59, 121.39, 121.45, 74, 75, 124.02

(56) References Cited

U.S. PATENT DOCUMENTS 5,166,494 A * 11/1992 Luo et al. .............. 219/121.55
5,695,662 A * 12/1997 Couch et al. ........... 219/121.39
5,938,948 A * 8/1999 Oros et al. .............. 219/121.46
6,326,583 B1 * 12/2001 Hardwick et al. ...... 219/121.55
6,772,040 B1 * 8/2004 Picard et al. ................ 700/166

* cited by examiner

Primary Examiner—Mark Paschall
(74) Attorney, Agent, or Firm—Harness, Dickey & Pierce, P.L.C.

(57) ABSTRACT

A system for controlling gas flow from a gas source, through a gas conduit, and to a plasma arc torch during a transition from a cold flow when no arc is present to a hot flow when an arc is provided by the present invention. The system comprises a first solenoid in communication with the gas source, a second solenoid disposed proximate the plasma arc torch, and a bypass circuit in communication with the gas source and the second solenoid. The bypass circuit comprises a bypass solenoid that controls the gas pressure within the gas conduit to reduce gas flow fluctuations when transitioning from cold flow to hot flow. Additional gas control systems and methods are also provided that cause the gas pressure to be higher during cold flow, prior to arc ignition, which overcomes the rapid drop in flow that typically occurs during the transition to hot flow.

20 Claims, 12 Drawing Sheets

GAS FLOW PRE-CHARGE FOR A PLASMA ARC TORCH

FIELD OF THE INVENTION

The present invention relates generally to gas control systems for plasma arc torches and more particularly to devices and methods for regulating gas pressure prior to arc ignition to reduce gas flow fluctuations when transitioning from cold flow (no arc) to hot flow (arc present).

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

During the pilot arc and transferred arc modes, or just prior to and in the cutting mode, the gas flow is commonly referred to as "hot flow", whereas prior to arc ignition the gas flow is commonly referred to as "cold flow" (when no arc is present). During both hot flow and cold flow, the plasma arc torch presents a restriction to the gas flow, which is greater during hot flow than during cold flow. Thus, during hot flow, the flow rate of the gas through the plasma arc torch is lower than the flow rate of the gas during cold flow and the pressure is higher. Additionally, the flow rate decreases and the pressure increases with increasing current level since the increased current introduces a greater restriction within the plasma arc torch. In operation, when the gas flow transitions from cold flow (no arc) to hot flow (arc present), the gas flow rate drops rapidly due to the greater restriction and then slowly returns to the desired level, which is typically set prior to arc ignition. Therefore, a cold flow must be set that results in the desired hot flow once the arc is established. As a result, the first few seconds of the cut, while the flow is recovering, is typically less than optimum quality.

The flow rate of the gas also affects arc voltage such that when the gas flow rate fluctuates, the arc voltage also fluctuates. This can be problematic in plasma arc cutting systems that use arc voltage as a feedback signal to control torch standoff, or height above the workpiece being cut. The proper torch height will not be maintained until the flow has stabilized, and as a result, a less than optimum quality cut occurs when the gas flow fluctuates and the torch height is not properly set. Additionally, the low gas flow rate when transitioning from cold flow to hot flow often causes a double arcing condition, wherein the arc transfers back to the plasma arc torch from the workpiece, typically at the tip, which damages the tip orifice and also produces less than optimum quality cuts.

SUMMARY OF THE INVENTION

In one preferred form, the present invention provides a system for controlling gas flow from a gas source, through a gas conduit, and to a plasma arc torch during a transition from a cold flow when no arc is present to a hot flow when an arc is present. The system comprises a first solenoid in communication with the gas source with an off position and an on position, and a second solenoid disposed proximate the plasma arc torch and in communication with the first solenoid, wherein the second solenoid also has an off position and an on position. The system further comprises a bypass circuit in communication with the gas source and the second solenoid, wherein the bypass circuit comprises a bypass solenoid that has an off position and an on position. Accordingly, the gas pressure within the gas conduit is controlled by the bypass solenoid to reduce gas flow fluctuations when transitioning from cold flow to hot flow.

In another form of the present invention, a gas flow control system is provided that comprises a first solenoid in communication with the gas source, a second solenoid disposed proximate the plasma arc torch and in communication with the first solenoid, and a pressure transducer in communication with the first solenoid and the second solenoid. The pressure transducer senses the gas pressure within the gas conduit between the two solenoids and sends an appropriate control signal to one of the solenoids. For example, a control signal is sent to the first solenoid to open and to the second solenoid to close if the gas pressure is too low, and a control signal is sent to the first solenoid to close and to the second solenoid to open if the gas pressure is too high prior to arc ignition.

The present invention also includes a system for controlling gas flow from a gas source, through a gas conduit, and to a plasma arc torch during a transition from a cold flow when no arc is present to a hot flow when an arc is present using a separate pre-charge circuit. The pre-charge circuit is in communication with the gas conduit between a first solenoid and a second solenoid, and the pre-charge circuit comprises a pre-charge gas source and a pre-charge solenoid in communication with the pre-charge gas source. The pre-charge solenoid controls the gas pressure within the gas conduit to reduce gas flow fluctuations when transitioning from cold flow to hot flow.

In another form of the present invention, a method of controlling gas pressure within a gas conduit for a plasma arc torch prior to arc ignition is provided. The method comprises the steps of setting a first solenoid and a second solenoid to an off position, setting a gas pressure within a bypass circuit, and setting a bypass solenoid to an on position. Accordingly, the gas pressure within the gas conduit is controlled to overcome gas flow fluctuations during a transition from a cold flow when no arc is present to a hot flow when an arc is present.

Another method of controlling gas flow is provided according to the present invention that comprises the steps of setting a first solenoid and a second solenoid to a closed position, sensing a gas pressure within the gas conduit between the first solenoid and the second solenoid, sending a control signal to the first solenoid to open when the gas pressure is below an established value, and sending a control signal to the second solenoid to open when the gas pressure is above an established value prior to arc ignition.

In another aspect of the present invention, a method of controlling gas flow within a gas conduit of a plasma arc torch is provided during a transition from a cold flow when no arc is present to a hot flow when an arc is present. The method comprises the step of controlling the gas pressure within a gas conduit prior to arc ignition to a desired pressure level to reduce gas flow fluctuations when transitioning from cold flow to hot flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE PREFERRED EMBODIMENTS

The following description of the preferred embodiments is merely exemplary in nature and is in no way intended to limit the invention, its application, or uses.

Figure 1:
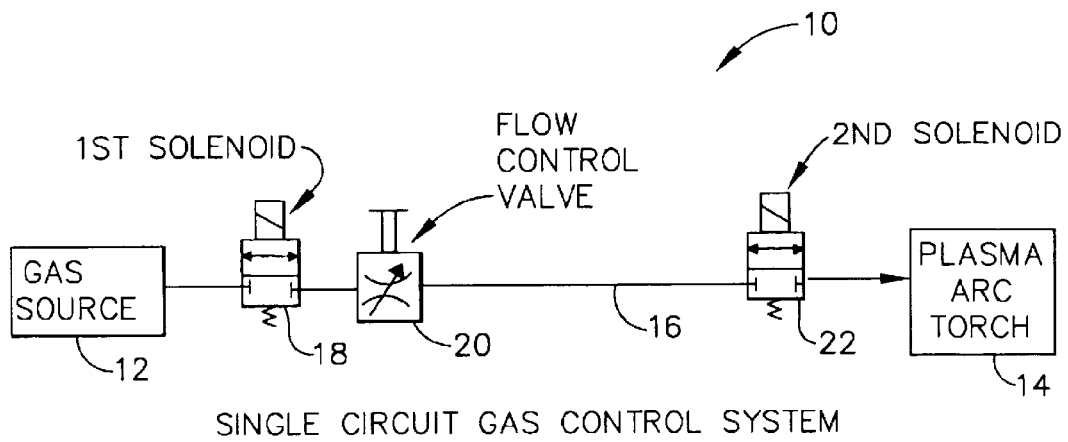
FIG. 1 is a schematic of a prior art single circuit gas control system.

Referring to FIG. 1, a prior art single circuit gas control system 10 is shown that comprises a gas source 12, a plasma arc torch 14, and a length of gas conduit 16 that connects the gas source 12 to the plasma arc torch 14. The single circuit gas control system 10 also includes a first solenoid 18, a flow control valve 20, and a second solenoid 22 as shown. The flow control valve 20 and the first solenoid 18 are generally some distance from the plasma arc torch 14, (accessible to an operator), and are connected by the gas conduit 16 to the second solenoid 22, which is disposed proximate the plasma arc torch 14. The second solenoid 22 allows the gas conduit 16, except for the short length between the second solenoid 22 and the plasma arc torch 14, to be filled with gas before starting. Without the second solenoid 22, and with the flow control valve 20 some distance from the plasma arc torch 14, an excessive amount of time would be required to fill the gas conduit 16 and obtain the proper gas flow rate to the plasma arc torch 14. Additionally, the flow control valve 20 allows a specific value to be set for the gas flow within the gas conduit 16 between the first solenoid 18 and the second solenoid 22.

In operation, the first solenoid 18 and the second solenoid 22 are turned on and off at the same time. More specifically, the solenoids 18 and 22 are turned on prior to arc ignition and are turned off after arc ignition in a plasma cutting system with a separate pre-flow circuit. In a plasma cutting system without a separate pre-flow circuit, the solenoids 18 and 22 are turned on prior to and during arc ignition and are turned off when the arc is extinguished. Therefore, the single circuit gas control system 10 may be used for plasma gas, secondary gas, and/or for pre-flow gas that is used prior to arc ignition.

Figure 2:
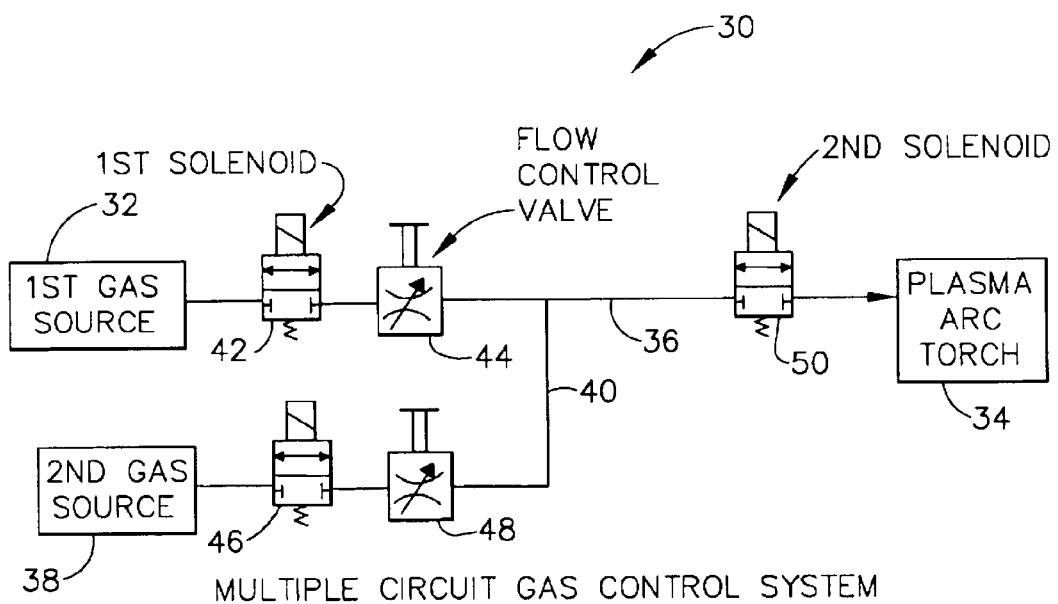
FIG. 2 is a schematic of a prior art multiple circuit gas control system.

As shown in FIG. 2, a prior art multiple circuit gas control system 30 is shown that provides for the mixing of gases or for the selection of one among multiple gas sources. The multiple circuit gas control system 30 comprises a first gas source 32, a plasma arc torch 34, and a first length of conduit 36 that connects the first gas source 32 to the plasma arc torch 34. A second gas source 38 is also provided that is connected to the plasma arc torch 34 through the second length of conduit 40. A first gas source solenoid 42 and flow control valve 44 are disposed proximate the first gas source 32, a second gas source solenoid 46 and flow control valve 48 are disposed proximate the second gas source 38, and a second solenoid 50 is disposed proximate the plasma arc torch 34. The solenoids 42, 46, and 50 operate as previously described with the single circuit gas control system 10, and the flow control valves 44 and 48 are used to either mix the gases or select from only one of the first gas source 32 or the second gas source 38.

Unfortunately, with these prior art gas control systems 10/30, when the gas flow transitions from cold flow (no arc), to hot flow (arc present), the gas flow drops rapidly due to the greater restriction of the plasma arc torch 14/34 and then slowly returns to the desired level, which is typically set by the flow control valves 20/44/48 prior to arc ignition. For example, in a pre-flow circuit, the first and second solenoids 20/22 and 42/46/50 are turned on prior to arc ignition, and then the first and second solenoids 20/22 and 42/46/50 are turned off after arc ignition. Due to the greater restriction of the plasma arc torch 14/34 during hot flow, the gas flow drops rapidly after the arc is ignited, which results in a less than desirable cut quality for a period of time until the gas flow stabilizes back to its set value.

Figure 3:
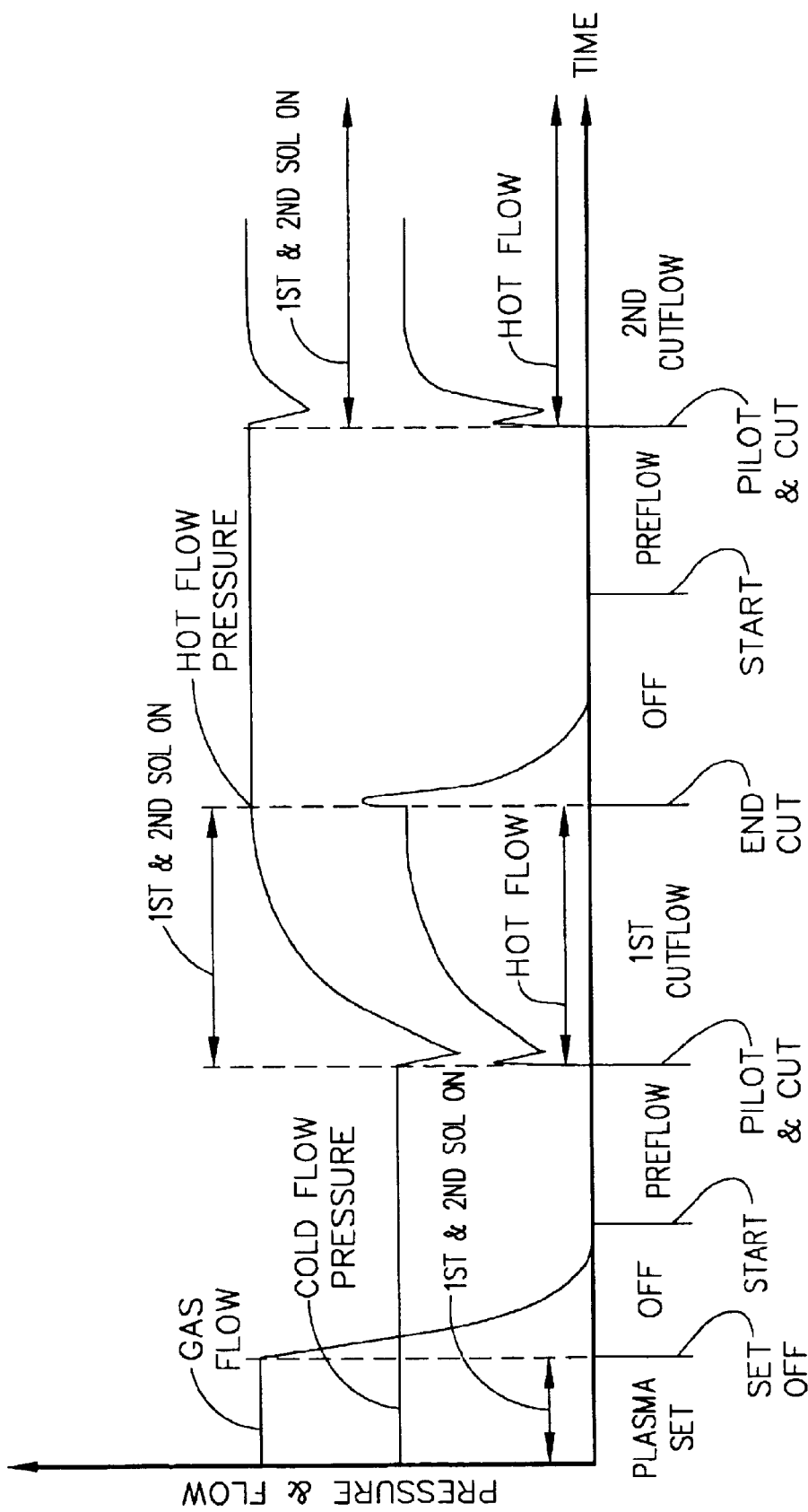
FIG. 3 is a graph illustrating gas pressure and gas flow during operation of the prior art single circuit gas control system.

To more specifically describe operation of the prior art gas control systems 10/30, FIG. 3 illustrates the sequence of gas flow and arc ignition along with gas flow and gas pressure within a plasma cut flow circuit. The gas pressure is measured within the gas conduit 16 between the first solenoid 20 and the second solenoid 22, and the plasma gas flow is measured at the exit orifice of the plasma arc torch 14. Initially, the flow of plasma gas desired for operation is set, which is reflected by the plasma flow level as shown and a corresponding cold flow pressure. During this time, both the first and second solenoids 20/22 are on. After the plasma flow is set and prior to applying a start signal, the first and second solenoids 20/22 are turned off, wherein the pressure remains constant and the flow drops off between the two solenoids as shown. When a start signal is applied and after a period of time for pre-flow (flow not shown), the first and second solenoids 20/22 are turned on and the pilot arc is initiated within the plasma arc torch 14. Due to the greater restriction of the plasma arc torch 14 as previously described, the gas pressure and the gas flow drop initially as shown and then rise to their respective stabilized value during the hot flow period, or while the plasma arc torch 14 is cutting. The initial spike shown in the gas flow is due to the sudden outrush of gas that occurs when opening the solenoids. When cutting is complete and the plasma arc torch 14 is turned off and the first and second solenoids 20/22 are turned off, the pressure between the solenoids remains constant, while the gas flow shows an initial spike due to the greater restriction of the plasma arc torch 14 being removed from the circuit and then a decay of the gas flow until the sequence is initiated prior to the next cut. Accordingly, each time the pilot arc is initiated, the gas flow drops rapidly which results in a less than desirable cut quality and a tendency to cause double arcing.

Figure 4:
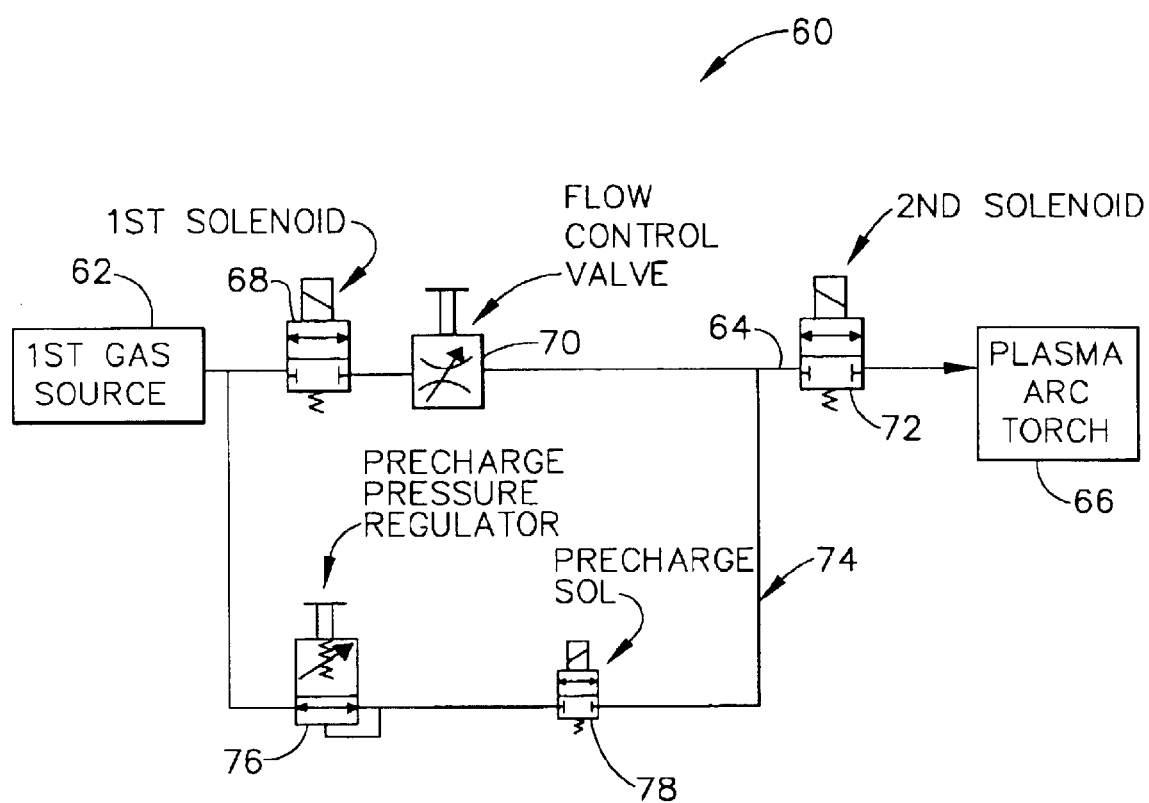
FIG. 4 is a schematic of a gas control system having a bypass circuit in accordance with the principles of the present invention.

Referring now to FIG. 4, a system for controlling gas flow during the transition from cold flow when no arc is present to hot flow when an arc is present is illustrated and generally indicated by reference numeral 60. The gas control system 60 controls gas flow from a gas source 62, through a gas conduit 64, and to a plasma arc torch 66. The gas control system 60 also includes a first solenoid 68, a flow control valve 70, and a second solenoid 72 as shown. The flow control valve 70 and the first solenoid 68 are generally some distance from the plasma arc torch 66, (accessible to an operator), and are connected by the gas conduit 64 to the second solenoid 72, which is disposed proximate the plasma arc torch 66. The second solenoid 72 allows the gas conduit 64, except for the short length between the second solenoid 72 and the plasma arc torch 66, to be filled with gas before starting. The flow control valve 70 allows a specific value to be set for the gas flow within the gas conduit 64 between the first solenoid 68 and the second solenoid 72.

As further shown, the gas control system 60 also comprises a bypass circuit 74 that bypasses the first solenoid 68 and the flow control valve 70. The bypass circuit 74 preferably comprises a pressure regulator 76 and a bypass solenoid 78. The bypass solenoid 78 has an on position that allows gas to flow through the bypass circuit 74 and into the gas conduit 64, and an off position that conversely does not allow gas flow through the bypass circuit 74. The pressure regulator 76 is used to set the pressure level of the gas within the bypass circuit 74 and the gas conduit 64, although in another form, the pressure from the gas source 62 could be used without the pressure regulator 76. While the first solenoid 68 and the second solenoid 72 are turned off prior to arc ignition, the bypass solenoid 78 is open, thereby providing a pre-charge of gas within the gas conduit 64, or a higher pressure than that which is typically set during pre-flow or set flow. Then, when the first solenoid 68 and the second solenoid 72 are turned on, and the bypass solenoid is turned off, the higher gas pressure within the gas conduit 64 causes the gas flow to be higher during the cold flow period, prior to arc ignition, which overcomes the rapid drop in flow that typically occurs during the transition to hot flow. Therefore, the gas flow drops to the desired level rather than below the desired level, which results in improved cut quality.

During cutting, if the hot flow pressure is too high, a higher than desired pressure is trapped between the first solenoid 68 and the second solenoid 72 when the solenoids close as the plasma arc torch 66 shuts down. When this occurs and the gas pressure within the gas conduit 64 is too high, the pressure regulator 76 regulates the pressure within the gas conduit 64 to the desired level prior to arc ignition when the first solenoid 68 is closed, the second solenoid 72 is closed, and the bypass solenoid 78 is turned on. Alternately, another form of the present invention would not require the pressure regulator 76, wherein the first solenoid 68 and the bypass solenoid 78 are turned off while the second solenoid 72 is turned on to reduce the pressure of the gas within the gas conduit 64.

Figure 5:
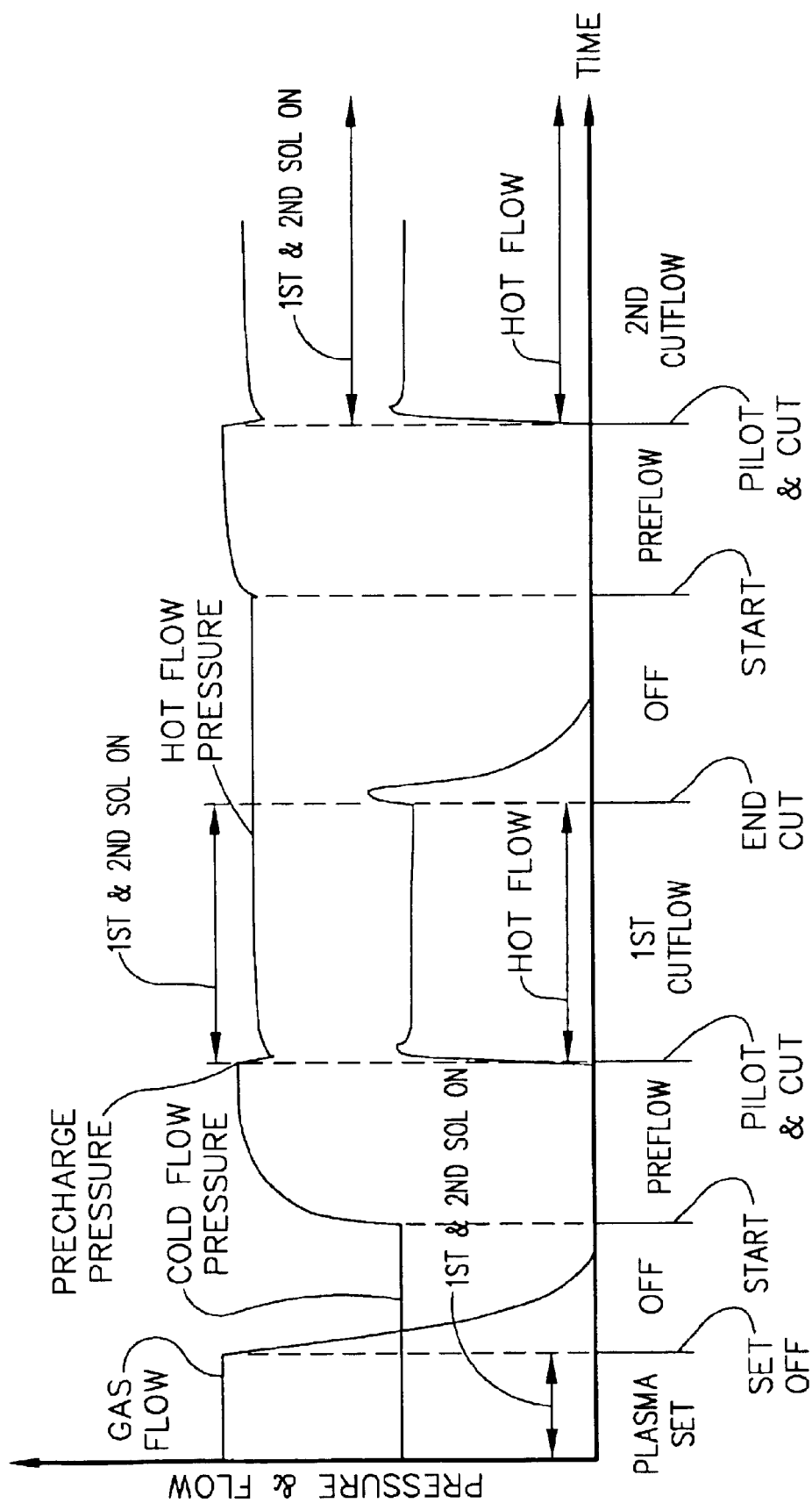
FIG. 5 is a graph illustrating gas pressure and gas flow during operation of the bypass circuit when the pressure is increased prior to arc ignition in accordance with the principles of the present invention.

FIG. 5 illustrates the improvement in gas flow and pressure during the sequence of operation as previously described in FIG. 3 within a plasma cut flow circuit when the pressure between the first solenoid 68 and the second solenoid 72 is to be increased. As shown, the gas pressure is increased above the desired level during the pre-flow period prior to arc ignition, which reduces the gas flow fluctuations when transitioning from cold flow to hot flow.

Figure 6:
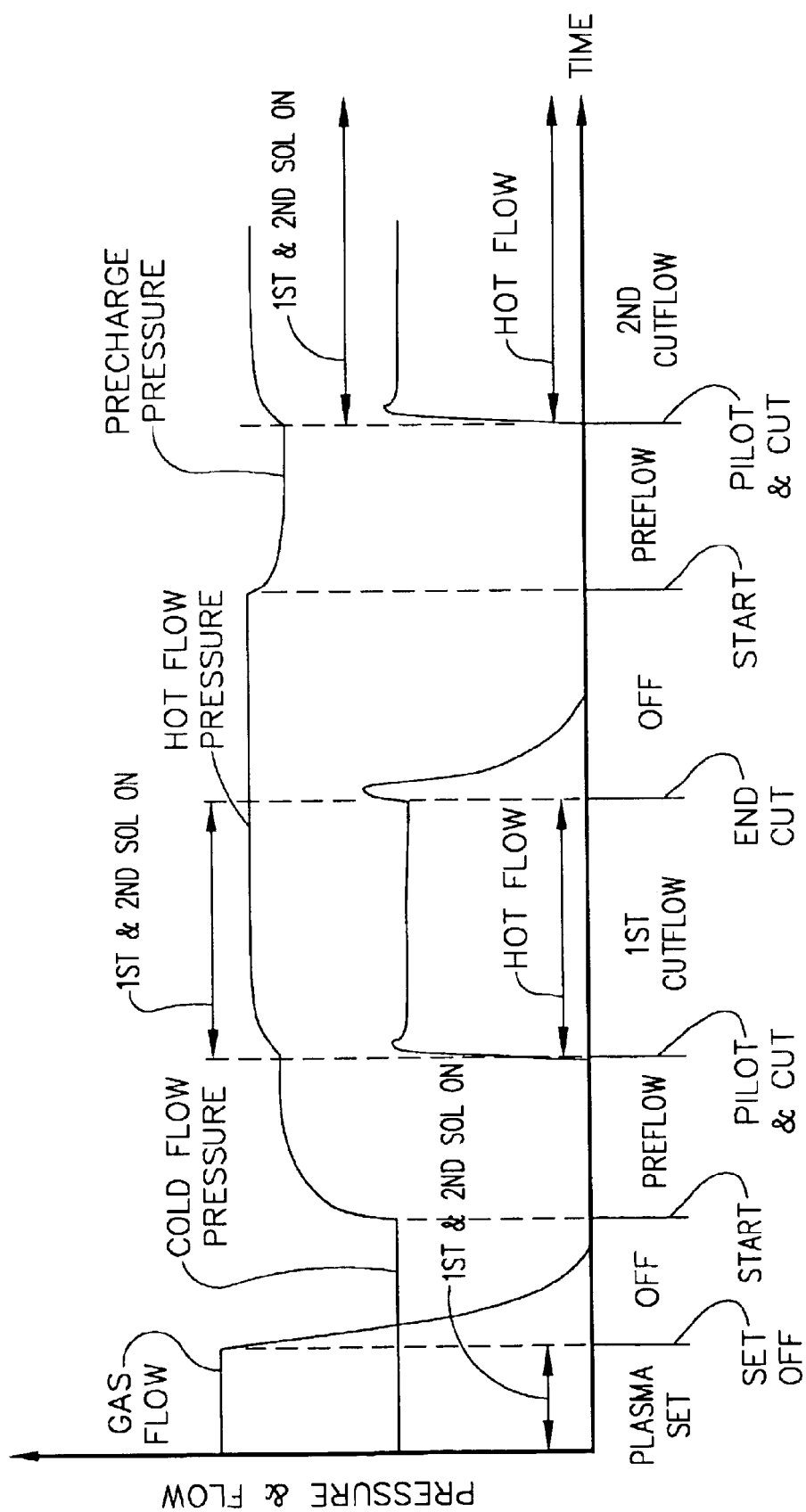
FIG. 6 is a graph illustrating gas pressure and gas flow during operation of the bypass circuit when the pressure is decreased prior to arc ignition in accordance with the principles of the present invention

FIG. 6 illustrates the improvement in gas flow and pressure during the sequence of operation as previously described in FIG. 3 within a plasma cut flow circuit when the pressure between the first solenoid 68 and the second solenoid 72 is to be decreased. Initially, the gas pressure is increased above the desired level during the pre-flow period prior to arc ignition, which reduces the gas flow fluctuations when transitioning from cold flow to hot flow. However, as shown by the graph, the pressure between the first and second solenoids 68/72 is trapped at a higher pressure than desired after the plasma arc torch 14 is turned off, which is often due to the hot flow restriction during cutting. Therefore, the pressure regulator 76 regulates the pressure to a lower level as shown, which is the desired pre-charge value that was set prior to the initial operation. As a result, gas flow fluctuations are reduced during the initial transition from cold flow to hot flow, thereby improving cut quality.

Figure 7:
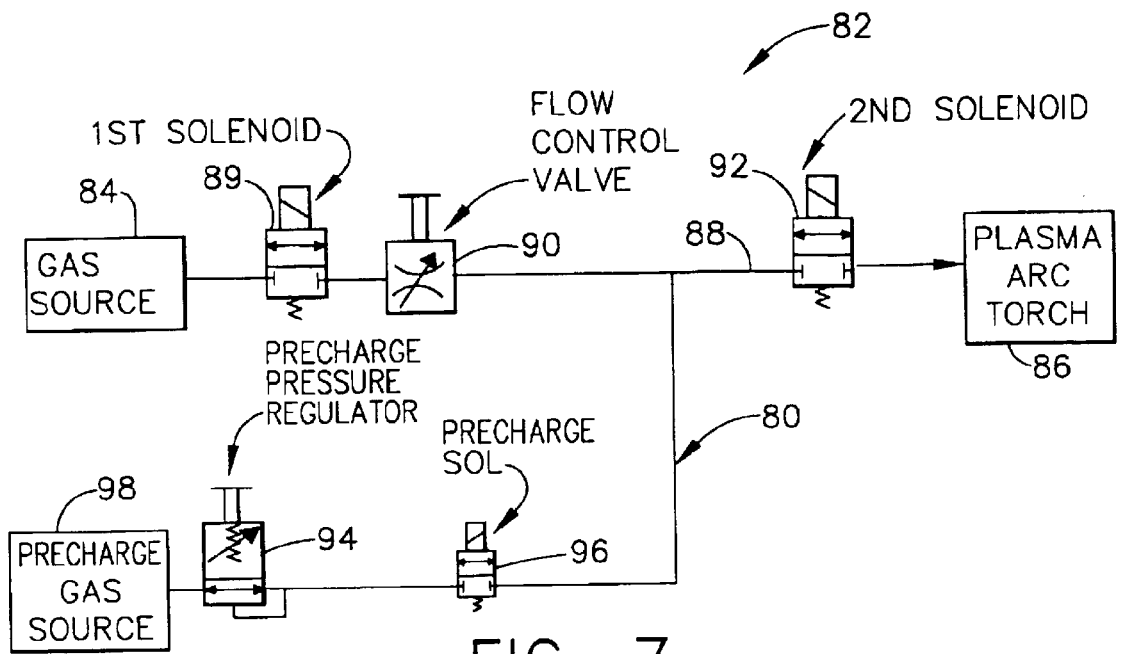
FIG. 7 is a schematic of a gas control system having a separate pre-charge circuit in accordance with the principles of the present invention.

As shown in FIG. 7, a separate pre-charge circuit 80 is used in conjunction with a gas control system 82 in another form of the present invention. The gas control system 82 similarly comprises a gas source 84, a plasma arc torch 86, and a gas conduit 88 that connects the gas source 84 to the plasma arc torch 86. Additionally, a first solenoid 89 and a flow control valve 90 are disposed proximate the gas source 84 and a second solenoid 92 is disposed proximate the plasma arc torch 86. The pre-charge circuit 80 comprises a pre-charge pressure regulator 94 and a pre-charge solenoid 96 that are in communication with a separate pre-charge gas source 98 rather than the gas source 84. As further shown, the pre-charge circuit 80 is connected to the gas conduit 88 in order to provide a gas pre-charge prior to arc ignition. While the first solenoid 89 and the second solenoid 92 are turned off prior to arc ignition, the pre-charge solenoid 96 is open, thereby providing a pre-charge of gas within the gas conduit 88, or a higher pressure than that which is typically set during pre-flow or set flow. Then, when the first solenoid 89 and the second solenoid 92 are turned on, and the pre-charge solenoid is turned off, the higher gas pressure within the gas conduit 88 causes the gas flow to be higher during the cold flow period, prior to arc ignition, which overcomes the rapid drop in flow that typically occurs during the transition to hot flow.

When the gas pressure within the gas conduit 88 is too high when the first solenoid 89 and the second solenoid 92 are turned off and the pre-charge solenoid 96 is turned on, the pre-charge pressure regulator 94 regulates the pressure within the gas conduit 88 to the desired level prior to arc ignition. Alternately, another form of the present invention would not require the pre-charge pressure regulator 94, wherein the first solenoid 89 and the pre-charge solenoid 96 are turned off while the second solenoid 92 is turned on to reduce the pressure of the gas within the gas conduit 88.

Figure 8:
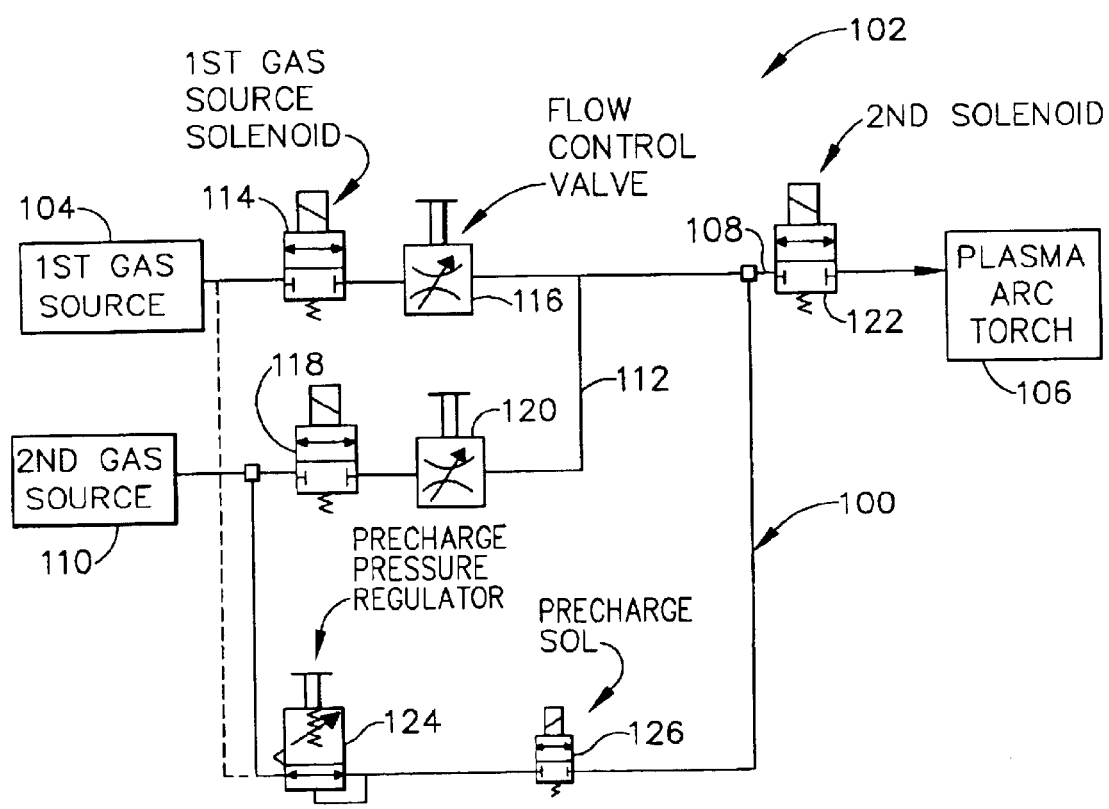
FIG. 8 is a schematic of a pre-charge circuit within a multiple circuit gas control system in accordance with the principles of the present invention.

Referring now to FIG. 8, another form of the present invention is provided, wherein a pre-charge circuit 100 is used with a multiple circuit gas control system 102. As previously described, the multiple circuit gas control system 102 is generally used for either gas mixing or to select a specific gas source. Accordingly, the multiple circuit gas control system 102 comprises a first gas source 104, a plasma arc torch 106, and a first length of conduit 108 that connects the first gas source 102 to the plasma arc torch 106. A second gas source 110 is also provided that is connected to the plasma arc torch 106 through the second length of conduit 112. A first gas source solenoid 114 and flow control valve 116 are disposed proximate the first gas source 104, a second gas source solenoid 118 and flow control valve 120 are disposed proximate the second gas source 110, and a second solenoid 122 is disposed proximate the plasma arc torch 106. The solenoids 114, 118, and 122 operate as previously described with the previous gas control systems 60/82, the flow control valves 116 and 120 are used to mix the gases, and the first gas source solenoid 114 and the second gas source solenoid 118 are used to select from one or both of the first gas source 104 and the second gas source 110. Although only two gas sources are shown, additional gas sources and pre-charge circuits 100 may also be employed while remaining within the scope of the present invention.

The pre-charge circuit 100 preferably comprises a pre-charge pressure regulator 124 and a pre-charge solenoid 126 that are in communication with the second gas source 110 and the first length of gas conduit 108. Alternately, the pre-charge circuit 100 may also be in communication with the first gas source 104 as indicated by the dashed line. Therefore, the pre-charge circuit 100 may be in communication with one or more gas sources while remaining within the scope of the present invention. The pre-charge circuit 100 bypasses the second gas source solenoid 118 and flow control valve 120 and thus provides a pre-charge to the first length of gas conduit 108 between the flow control valve 116 and the second solenoid 122. While the first gas source solenoid 114, the second gas source solenoid 118, and the second solenoid 122 are turned off prior to arc ignition, the pre-charge solenoid 126 is open, thereby providing a pre-charge of gas within the first length of gas conduit 108, or a higher pressure than that which is typically set during pre-flow or set flow. Then, when the first gas source solenoid 114, the second gas source solenoid 118, and the second solenoid 122 are turned on, the higher gas pressure within the first length of gas conduit 108 causes the gas flow to be higher during the cold flow period, prior to arc ignition, which overcomes the rapid drop in flow that typically occurs during the transition to hot flow.

Additionally, if the pressure within the first length of gas conduit 108 is too high prior to arc ignition, the pre-charge solenoid 126, the first gas source solenoid 114, and the second gas source solenoid 118 are turned off while the second solenoid 122 is turned on to reduce the pressure within the first length of gas conduit 108 to a desired level. Alternately, the first and second gas source solenoids 114/118 can be turned off, the second solenoid 122 turned off, and the pre-charge solenoid 126 turned on such that the pre-charge pressure regulator 124 regulates the pressure within the first length of gas conduit 108 to the desired lower level. During cutting, when the hot flow pressure is high, a higher than desired pressure is trapped between the first gas source solenoid 114 and the second solenoid 122 when the solenoids close as the plasma arc torch 106 shuts down. Accordingly, the gas pressure within the first length of gas conduit 108 must be reduced to the desired level and can be accomplished by the present invention with selective use of the solenoids as described herein.

Figure 9A:
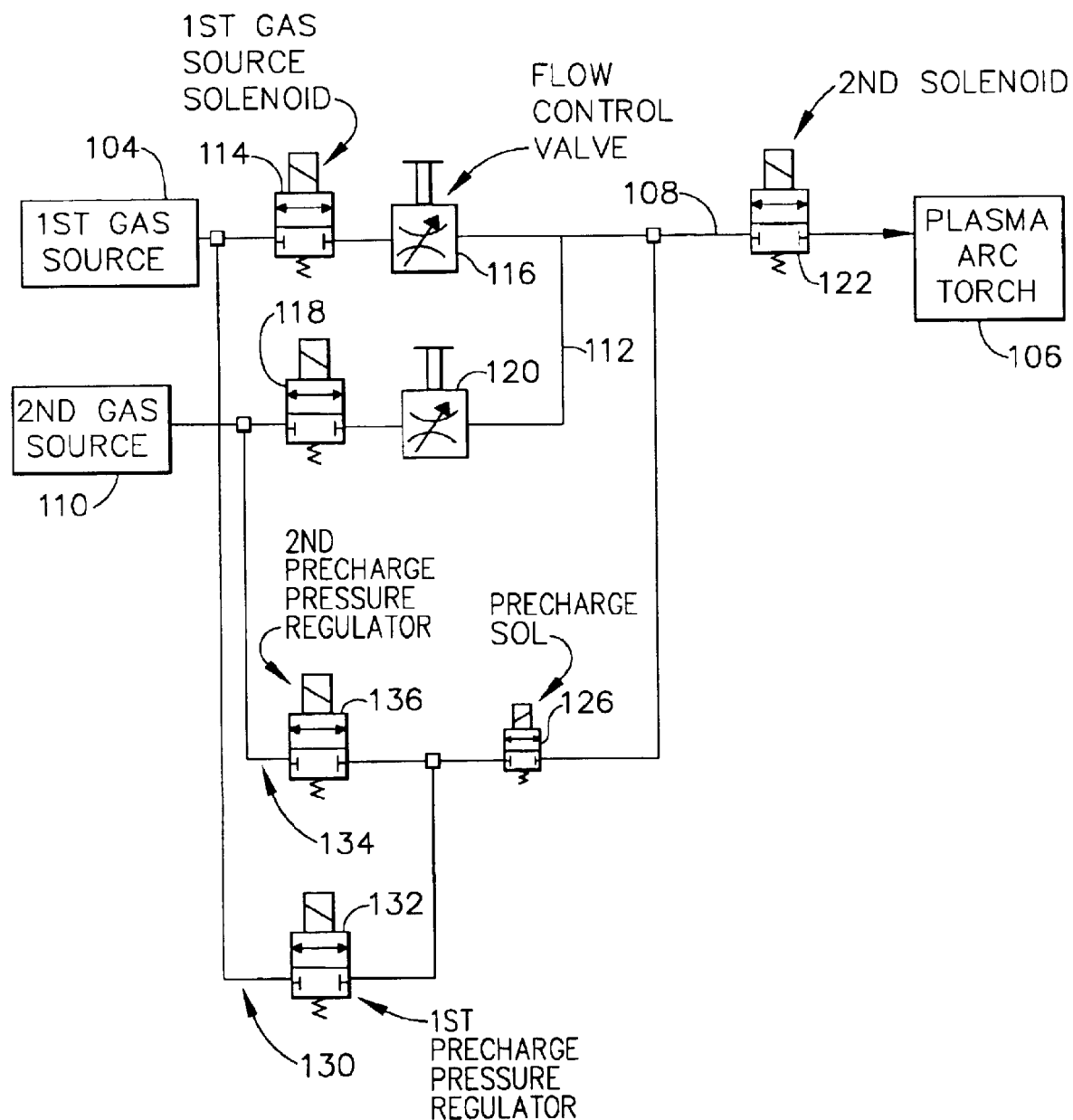
FIG. 9a is schematic of multiple pre-charge circuits with a single pre-charge solenoid within a multiple circuit gas control system in accordance with the principles of the present invention.
Figure 9B:
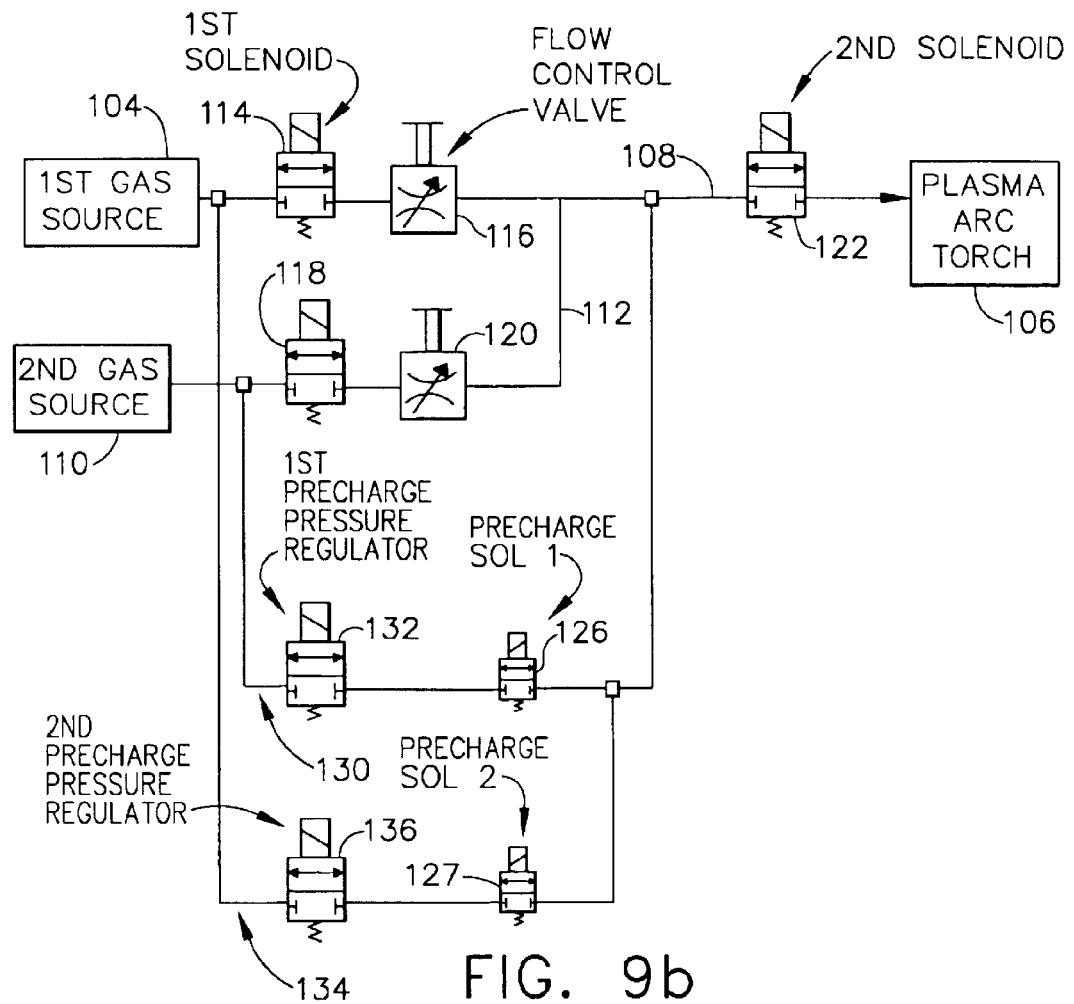
FIG. 9b is schematic of multiple pre-charge circuits with multiple pre-charge solenoids within a multiple circuit gas control system in accordance with the principles of the present invention.

As shown in FIGS. 9a and 9b, separate pre-charge circuits may be individually applied to each of the first gas source 104 and the second gas source 110 for gas mixing and/or for selective gas control. A first gas source pre-charge circuit 130 includes a first pre-charge pressure regulator 132 in communication with the first gas source 104 and the pre-charge solenoid 126 (FIG. 9a), while a second gas source pre-charge circuit 134 includes a second pre-charge pressure regulator 136 in communication with the second gas source 110 and the pre-charge solenoid 126. FIG. 9b illustrates separate pre-charge circuits with separate pre-charge solenoids 126 and 127. Accordingly, the first pre-charge flow control valve 132 and the second gas source pre-charge circuit 134 are used to adjust the amount of gas from each of the first gas source 104 and the second gas source 110, while the pre-charge circuits 130 and 134 operate as previously described to pre-charge the first length of gas conduit 108, thereby overcoming the rapid drop in flow that typically occurs during the transition to hot flow.

Figure 10:
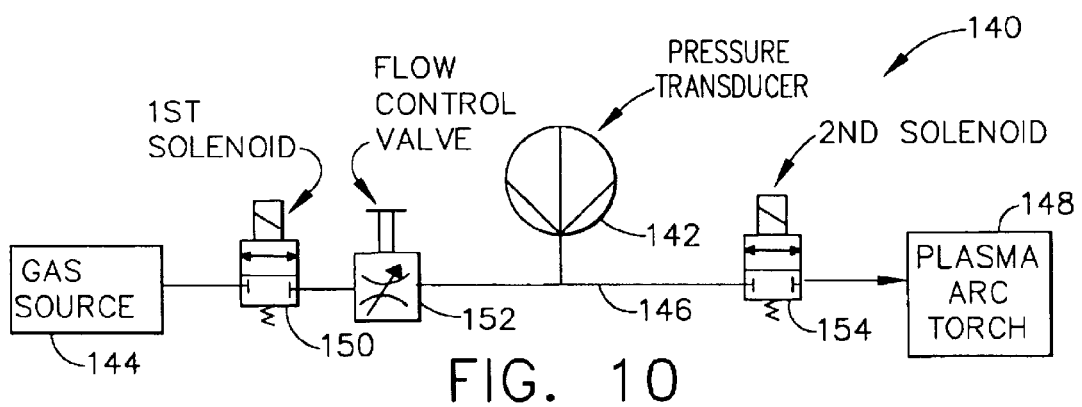
FIG. 10 is a schematic of a gas control system having a pressure transducer disposed between solenoids in accordance with the principles of the present invention.

In yet another form of the present invention, a gas control system 140 is provided that includes a pressure transducer 142 as shown in FIG. 10. The gas control system 140 controls gas flow from a gas source 144, through a gas conduit 146, and to a plasma arc torch 148. The gas control system 140 also includes a first solenoid 150, a flow control valve 152, and a second solenoid 154 as shown. The flow control valve 152 and the first solenoid 150 are generally some distance from the plasma arc torch 148, (accessible to an operator), and are connected by the gas conduit 146 to the second solenoid 154, which is disposed proximate the plasma arc torch 148. The second solenoid 154 allows the gas conduit 146, except for the short length between the second solenoid 154 and the plasma arc torch 148, to be filled with gas before starting. The flow control valve 152 allows a specific value to be set for the gas flow within the gas conduit 146 between the first solenoid 150 and the second solenoid 154.

The pressure transducer 142 is disposed within the gas conduit 146, between the first solenoid 150 and the second solenoid 154 as shown. During operation, the pressure transducer 142 senses the gas pressure within the gas conduit 146 and sends control signals to the first solenoid 150 and the second solenoid 154 to control the gas pressure. If the gas pressure within the gas conduit 146 is too low, the pressure transducer 142 sends a signal to a circuit which causes the first solenoid 150 to open and a signal to the second solenoid 154 to close which allows the gas pressure to increase. If the gas pressure within the gas conduit 146 is too high, the pressure transducer 142 sends a control signal to the circuit which causes the first solenoid 150 to close and a signal the second solenoid 154 to open which allows the gas pressure to decrease. Therefore, the gas pressure within the gas conduit 146 is maintained at a proper level to overcome the rapid drop in flow that typically occurs during the transition to hot flow and also to reduce the gas pressure within the gas conduit 146 as necessary. Additionally, the pressure transducer 142 may be used for single or multiple circuits, with plasma, secondary, and/or pre-flow gas flows.

Figure 11:
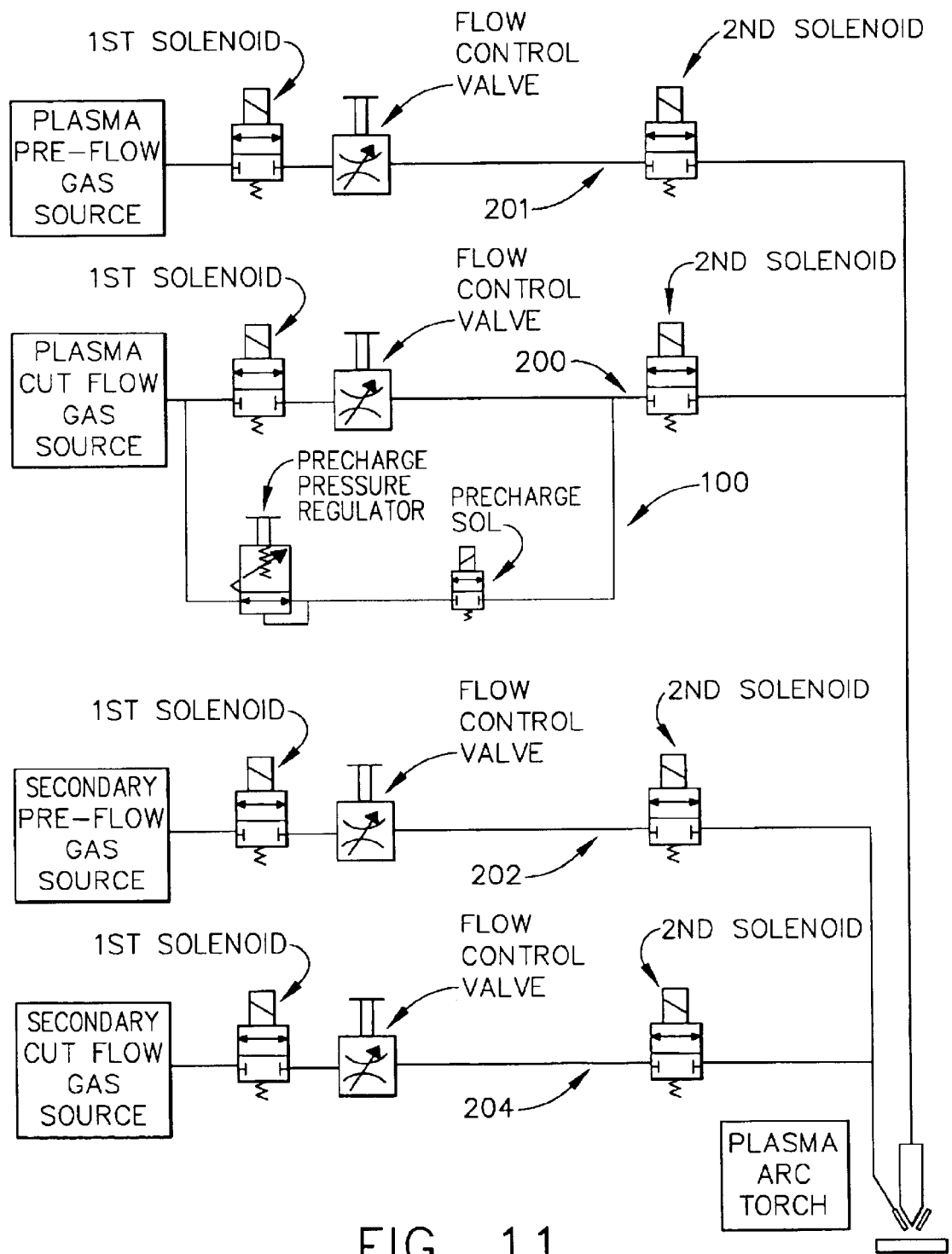
FIG. 11 is a schematic of a pre-charge circuit applied to a plasma cut-flow circuit among additional gas flow circuits in accordance with the principles of the present invention.
Figure 12:
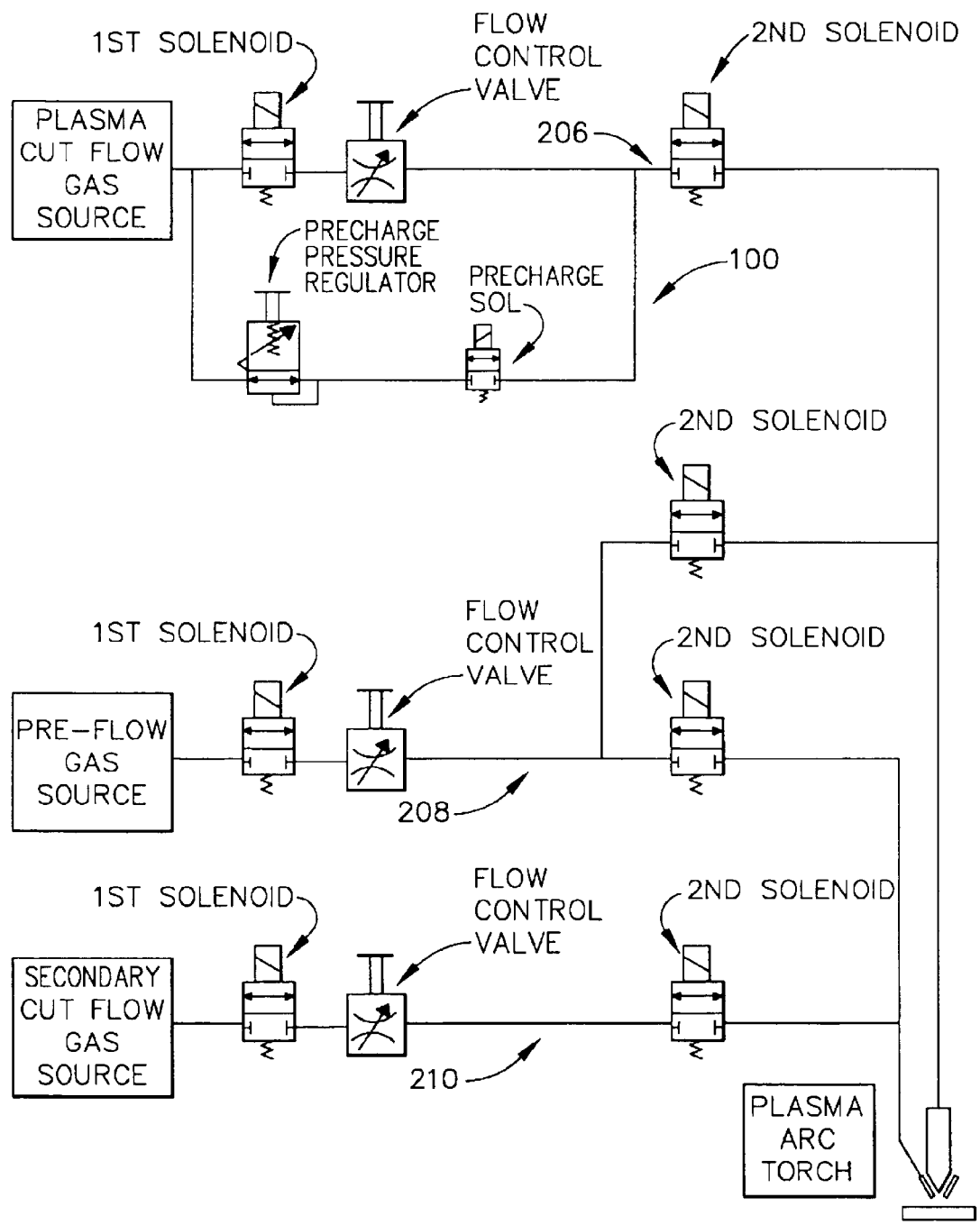
FIG. 12 is a schematic of a pre-charge circuit applied to a plasma cut-flow circuit wherein the amount of pre-flow going to the plasma flow and secondary flow is controlled in accordance with the principles of the present invention.
Figure 13:
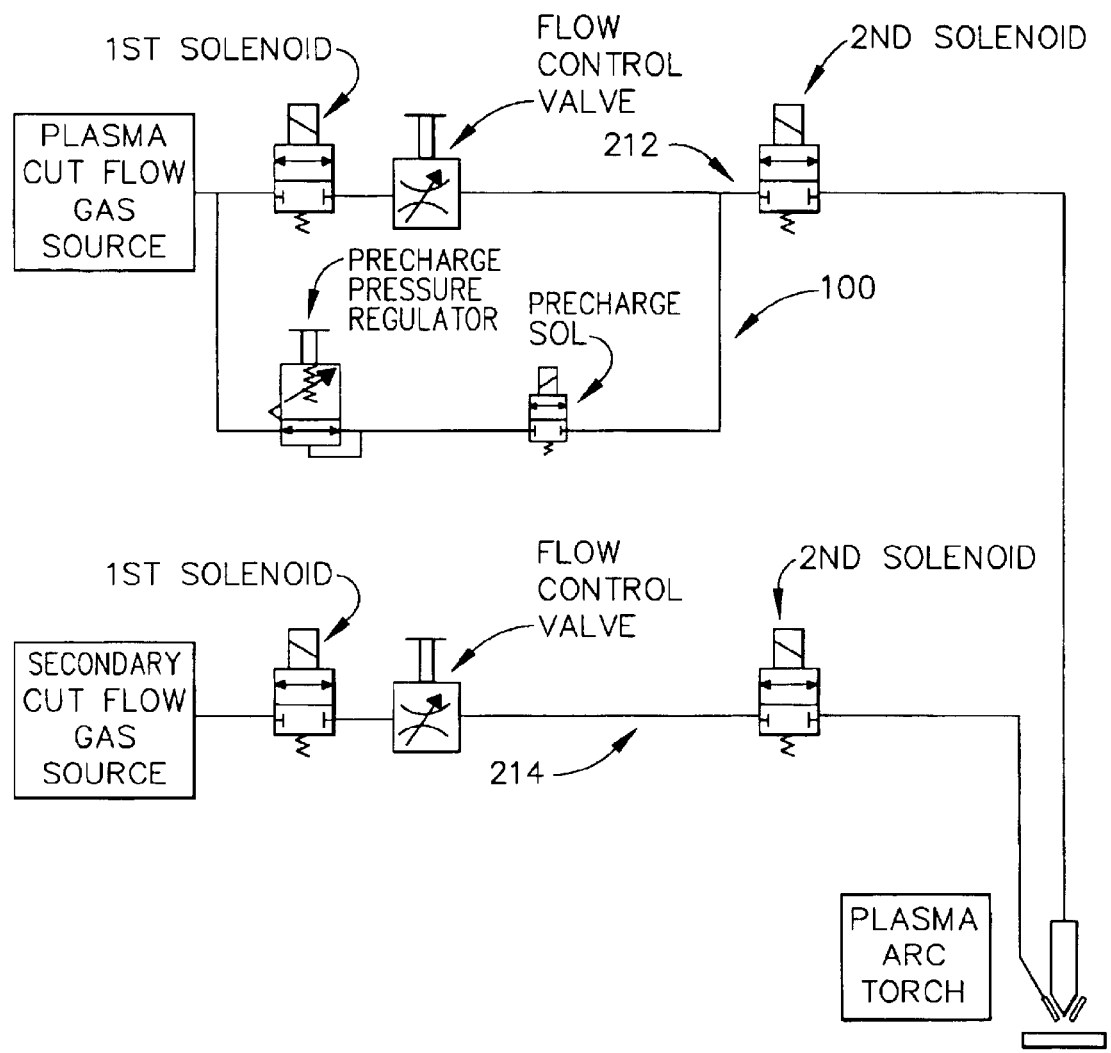
FIG. 13 is a schematic of a pre-charge circuit applied to a plasma cut-flow circuit with no pre-flow in accordance with the principles of the present invention.

The pre-charge circuit 100 according to the present invention may be used with one or more of a plasma cut-flow circuit, a plasma pre-flow circuit, a secondary gas cut-flow circuit, a secondary gas pre-flow circuit, and/or a separate pre-flow circuit. By way of example, application of the pre-charge circuit 100 to such circuits is shown in FIGS. 11 through 13. FIG. 11 shows the pre-charge circuit 100 applied to a plasma cut-flow circuit 200 only with additional pre-flow 201, secondary pre-flow 202, and secondary cut-flow 204 circuits. FIG. 12 shows the pre-charge circuit 100 applied to a plasma cut-flow circuit 206, wherein gas flow from a pre-flow circuit 208 can be mixed into the plasma cut-flow circuit 206 and a secondary cut-flow circuit 210. FIG. 13 shows the pre-charge circuit 100 applied to a plasma cut-flow circuit 212 with no pre-flow circuit and a secondary cut-flow circuit 214. Additional application of the pre-charge circuit 100 to individual circuits and combinations of circuits may also be employed while remaining within the scope of the present invention. Therefore, the pre-charge circuits 100 of FIGS. 11 through 13 should not be construed as limiting the scope of the present invention.

Figure 14:
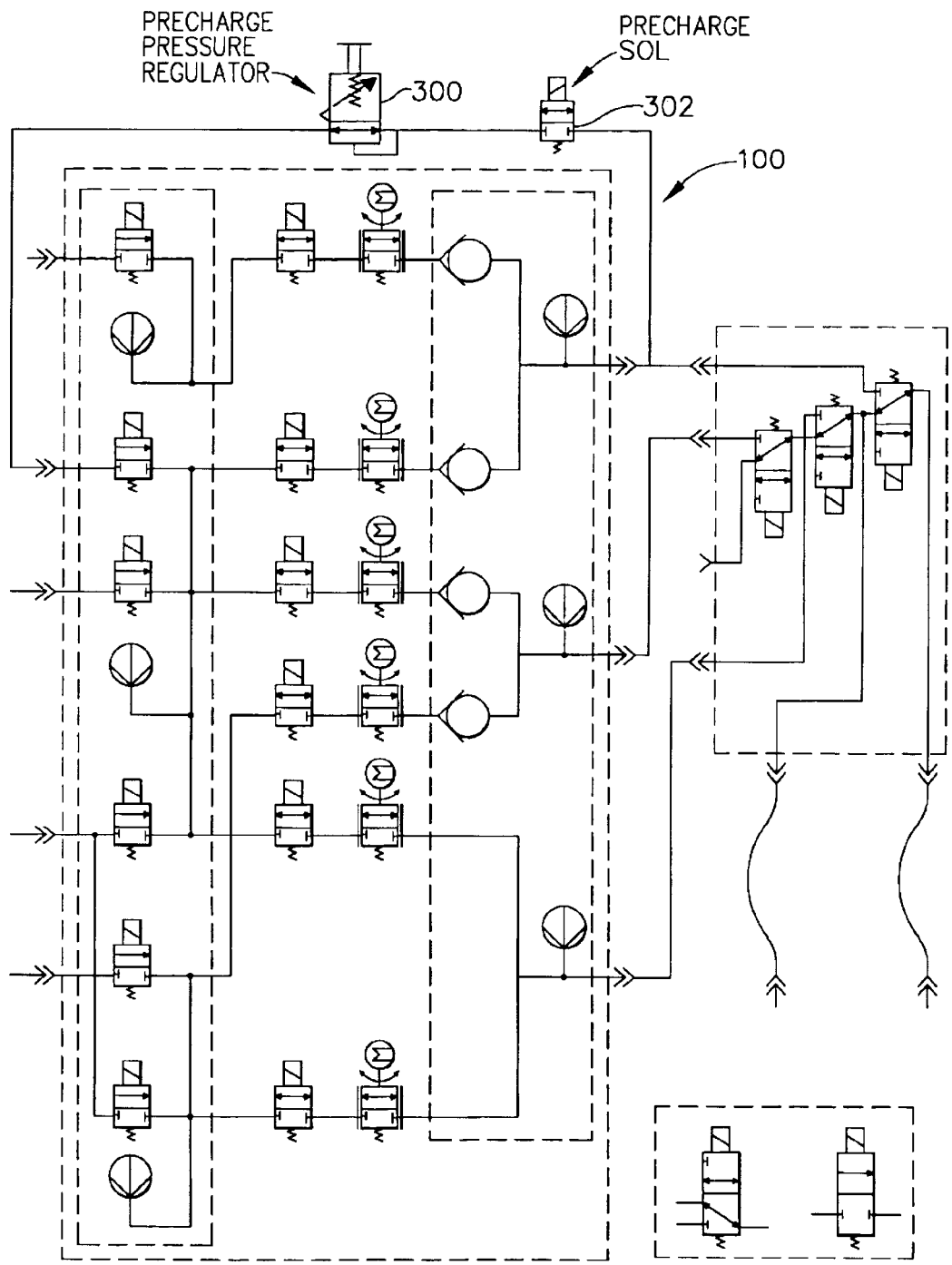
FIG. 14 is a schematic of a pre-charge circuit applied to a commercially available gas control system in accordance with the principles of the present invention.

Referring to FIG. 14, the pre-charge circuit 100 may also be employed with existing gas control systems such as the Hypertherm® 3070 gas control system. The pre-charge circuit 100 with a pre-charge pressure regulator 300 and a pre-charge solenoid 302 is connected to the plasma cut-flow circuit, although the pre-charge circuit 100 may also be applied to other circuits, individually or in combination, while remaining within the scope of the present invention.

Accordingly, the present invention provides various gas control systems and methods that cause the gas flow to be higher during the cold flow period, prior to arc ignition, which overcomes the rapid drop in flow that typically occurs during the transition to hot flow. Therefore, the gas flow drops to the desired level rather than below the desired level, which results in improved cut quality. Additionally, since the flow rate fluctuations are reduced, arc voltage fluctuations are also reduced, which results in improved torch height control and thus improved cut quality. Reduced flow rate fluctuations also reduce the possibility of double arcing and faster piercing is provided due to the initial higher gas flow provided by the present invention.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

Although the gas control systems according to the present invention use solenoids to turn the gas flow on and off within the gas conduit, other flow control devices commonly known in the art such as flow control valves or needle valves may also be employed while remaining within the scope of the present invention. Additionally, the device used as the solenoid may also be employed such that the flow is metered in addition to strictly being turned on and off as with a traditional solenoid. Accordingly, use of the term "solenoid" should not be construed as limiting the scope of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A system for controlling gas flow from a gas source, through a gas conduit, and to a plasma arc torch during a transition from a cold flow when no arc is present to a hot flow when an arc is present comprising:
a first solenoid in communication with the gas source, the first solenoid having an off position and an on position;
a second solenoid disposed proximate the plasma arc torch and in communication with the first solenoid, the second solenoid having an off position and an on position; and
a bypass circuit in communication with the gas source and the second solenoid, the bypass circuit comprising:
a bypass solenoid having an off position and an on position, wherein the gas pressure within the gas conduit is controlled by the bypass solenoid to reduce gas flow fluctuations when transitioning from cold flow to hot flow, and wherein when the bypass solenoid is in the open position and the first and second solenoids are in the closed positions, gas pressure of the gas within the gas conduit is increased.

2. The system according to claim 1, wherein when the bypass solenoid and the first solenoid are in the closed positions and the second solenoid is in the open position, gas pressure of the gas within the gas conduit is decreased.

3. The system according to claim 1, wherein the system is used for plasma gas flow.

4. The system according to claim 1, wherein the system is used for secondary gas flow.

5. The system according to claim 1, wherein the system is used for gas pre-flow.

6. The system according to claim 1 further comprising flow control valve in communication with the gas source and the first solenoid, the flow control valve regulating the flow of gas from the gas source to the plasma arc torch.

7. The system according to claim 1, wherein the bypass circuit further comprises a pressure regulator in communication with the gas source and the bypass solenoid, wherein the pressure regulator regulates the gas flow to a specific gas pressure within the gas conduit.

8. A system for controlling gas flow from a gas source, through a gas conduit, and to a plasma arc torch during a transition from a cold flow when no arc is present to a hot flow when an arc is present comprising:

a first solenoid in communication with the gas source, the first solenoid having an off position and an on position;

a second solenoid disposed proximate the plasma arc torch and in communication with the first solenoid, the second solenoid having an off position and an on position; and a pressure transducer in communication with the first solenoid and the second solenoid, the pressure transducer sensing gas pressure of the gas within the gas conduit and causing control signals to be sent to the first solenoid and the second solenoid to control the gas pressure to reduce gas flow fluctuations when transitioning from cold flow to hot flow, wherein when the first solenoid is in the open position and the second solenoid is in the closed position, gas pressure of the gas within the gas conduit is increased.

9. The system according to claim 8, wherein when the first solenoid is in the closed position and the second solenoid is in the open position, gas pressure of the gas within the gas conduit is decreased.

10. The system according to claim 8, wherein the system is used for plasma gas flow.

11. The system according to claim 8, wherein the system is used for secondary gas flow.

12. The system according to claim 8, wherein the system is used for gas pre-flow.

13. The system according to claim 8, further comprising a flow control valve in communication with the gas source and the first solenoid, the flow control valve regulating the flow of gas from the gas source to the plasma arc torch.

14. A system for controlling gas flow from a gas source, through a gas conduit, and to a plasma arc torch during a transition from a cold flow when no arc is present to a hot flow when an arc is present comprising:

a first solenoid in communication with the gas source, the first solenoid having an off position and an on position;

a second solenoid disposed proximate the plasma arc torch and in communication with the first solenoid, the second solenoid having an off position and an on position; and a pre-charge circuit in communication with the gas conduit between the first solenoid and the second solenoid, the pre-charge circuit comprising:
a pre-charge gas source; and
a pre-charge solenoid in communication with the pre-charge gas source, the pre-charge solenoid having an on position and an off position, wherein the gas pressure within the gas conduit is controlled by the pre-charge solenoid to reduce gas flow fluctuations when transitioning from cold flow to hot flow, wherein when the pre-charge solenoid is in the open position and the first and second solenoids are in the closed positions, gas pressure of the gas within the gas conduit is increased.

15. The system according to claim 14, wherein when the pre-charge solenoid and the first solenoid are in the closed positions and the second solenoid is in the open position, gas pressure of the gas within the gas conduit is decreased.

16. The system according to claim 14 further comprising flow control valve in communication with the gas source and the first solenoid, the flow control valve regulating the flow of gas from the gas source to the plasma arc torch.

17. The system according to claim 14, wherein the pre-charge circuit further comprises a pressure regulator in communication with the pre-charge gas source and the pre-charge solenoid, wherein the pressure regulator regulates the gas flow to a specific gas pressure within the gas conduit.

18. A method of controlling gas flow within a gas conduit for a plasma arc torch prior to arc ignition, the method comprising the steps of:

(a) setting a first solenoid and a second solenoid to an off position and setting a gas pressure within a bypass circuit; and (b) setting a bypass solenoid to an on position, wherein the gas pressure within the gas conduit between the first solenoid and the second solenoid is controlled to overcome gas flow fluctuations during a transition from a cold flow when no arc is present to a hot flow when an arc is present.

19. The method according to claim 18, wherein the gas pressure is increased.

20. The method according to claim 18, wherein the gas pressure is decreased.

* * * * *